United States Patent
Yoon et al.

(10) Patent No.: US 7,610,359 B2
(45) Date of Patent: Oct. 27, 2009

(54) METHOD AND APPARATUS FOR REPRODUCING DATA RECORDED ON AN INTERACTIVE RECORDING MEDIUM IN CONJUNCTION WITH ASSOCIATED AUXILIARY DATA RECORDED IN MULTIPLE LOCATIONS

(75) Inventors: Woo Seong Yoon, Namyangjoo-si (KR); Jee Yong Yoo, Seoul (KR); Tae Ho Kim, Seoul (KR); Byung Jin Kim, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 811 days.

(21) Appl. No.: 10/729,558

(22) Filed: Dec. 4, 2003

(65) Prior Publication Data
US 2004/0133661 A1    Jul. 8, 2004

(30) Foreign Application Priority Data
Dec. 7, 2002  (KR)  ............. 10-2002-0077595

(51) Int. Cl.
*G06F 15/16* (2006.01)
*H04N 7/26* (2006.01)

(52) U.S. Cl. .................... 709/219; 386/64; 386/66; 386/124

(58) Field of Classification Search .......... 709/219; 386/64, 66, 124
See application file for complete search history.

(56) References Cited

U.S. PATENT DOCUMENTS

| | | | |
|---|---|---|---|
| 5,687,160 A | 11/1997 | Aotake et al. | |
| 5,808,662 A * | 9/1998 | Kinney et al. | 348/14.1 |
| 5,815,194 A | 9/1998 | Ueda | |
| 5,909,551 A | 6/1999 | Tahara et al. | |
| 5,929,857 A | 7/1999 | Dinallo et al. | |
| 5,987,525 A | 11/1999 | Roberts et al. | |
| 5,995,091 A | 11/1999 | Near et al. | |
| 6,061,680 A | 5/2000 | Scherf et al. | |
| 6,130,998 A | 10/2000 | Jeong | |
| 6,138,175 A * | 10/2000 | deCarmo | 710/5 |
| 6,162,132 A | 12/2000 | Yoneyama et al. | |
| 6,230,207 B1 | 5/2001 | Roberts et al. | |
| 6,240,459 B1 | 5/2001 | Roberts et al. | |

(Continued)

FOREIGN PATENT DOCUMENTS

EP    0 737 009 A2    10/1996

(Continued)

OTHER PUBLICATIONS

Hideki Mimura, "DVD-Video Format," COMPCON '97. Proceedings, IEEE San Jose, CA, USA, Feb. 23-26, 1997; pp. 291-294. XP010219552; ISBN: 0/8186-7804-6.

*Primary Examiner*—Krisna Lim
(74) *Attorney, Agent, or Firm*—Birch, Stewart, Kolasch & Birch, LLP

(57) ABSTRACT

A method for reproducing data recorded on an interactive recording medium in conjunction with associated auxiliary data is disclosed. An interactive recording medium reproducing apparatus reproduces A/V data recorded on an interactive recording medium such as an interactive DVD in conjunction with contents data provided by a contents providing server using navigation information for the contents data also provided by the contents providing server, thereby allowing synchronized reproduction of data from different sources.

24 Claims, 5 Drawing Sheets

U.S. PATENT DOCUMENTS

| | | | |
|---|---|---|---|
| 6,564,255 B1* | 5/2003 | Mobini et al. | 709/219 |
| 6,654,769 B2* | 11/2003 | Ito et al. | 707/200 |
| 6,735,152 B2* | 5/2004 | Sato et al. | 369/30.08 |
| 6,957,387 B2 | 10/2005 | Barbieri | |
| 7,127,736 B2* | 10/2006 | Kondo et al. | 725/93 |
| 7,188,193 B1* | 3/2007 | Getsin et al. | 709/248 |
| 7,197,234 B1* | 3/2007 | Chatterton | 386/95 |
| 7,216,149 B1 | 5/2007 | Briscoe et al. | |
| 7,313,809 B1 | 12/2007 | Mohan et al. | |
| 7,376,333 B2 | 5/2008 | Chung et al. | |
| 7,392,481 B2* | 6/2008 | Gewickey et al. | 715/716 |
| 7,448,021 B1* | 11/2008 | Lamkin et al. | 717/115 |
| 7,451,453 B1* | 11/2008 | Evans et al. | 719/318 |
| 2001/0056580 A1 | 12/2001 | Seo et al. | |
| 2002/0037159 A1 | 3/2002 | Goto et al. | |
| 2002/0049981 A1 | 4/2002 | Tzou | |
| 2002/0078144 A1 | 6/2002 | Lamkin et al. | |
| 2002/0103855 A1 | 8/2002 | Chatani | |
| 2002/0106193 A1 | 8/2002 | Park et al. | |
| 2002/0112247 A1* | 8/2002 | Horner et al. | 725/112 |
| 2002/0122658 A1* | 9/2002 | Fukuda et al. | 386/95 |
| 2002/0147827 A1 | 10/2002 | Breiter et al. | |
| 2003/0016943 A1* | 1/2003 | Chung et al. | 386/46 |
| 2003/0028892 A1 | 2/2003 | Gewickey et al. | |
| 2003/0039187 A1 | 2/2003 | Geutskens | |
| 2003/0161615 A1* | 8/2003 | Tsumagari et al. | 386/95 |
| 2003/0229679 A1* | 12/2003 | Yoo et al. | 709/217 |
| 2004/0057699 A1 | 3/2004 | Kim et al. | |
| 2004/0096199 A1* | 5/2004 | Chou et al. | 386/125 |
| 2004/0133661 A1 | 7/2004 | Yoon et al. | |
| 2004/0247294 A1* | 12/2004 | Jung et al. | 386/95 |
| 2005/0081699 A1* | 4/2005 | Becker | 84/604 |
| 2005/0118417 A1 | 6/2005 | Min et al. | |
| 2005/0210505 A1* | 9/2005 | Chiu et al. | 725/43 |
| 2006/0031188 A1* | 2/2006 | Lara et al. | 707/1 |
| 2006/0117344 A1* | 6/2006 | Lamkin et al. | 725/38 |
| 2006/0143268 A1 | 6/2006 | Chatani | |
| 2006/0242161 A1* | 10/2006 | Ten Kate et al. | 707/100 |
| 2007/0122117 A1* | 5/2007 | Kimura | 386/95 |
| 2008/0131093 A1 | 6/2008 | Mohan et al. | |
| 2008/0177863 A1 | 7/2008 | Mohan et al. | |

FOREIGN PATENT DOCUMENTS

| | | |
|---|---|---|
| EP | 0 762 422 A2 | 3/1997 |
| EP | 1 003 304 A1 | 5/2000 |
| EP | 1 193 712 A2 | 4/2002 |
| EP | 1 229 542 A2 | 8/2002 |
| EP | 1 357 749 A1 | 10/2003 |
| JP | 06-141252 A | 5/1994 |
| JP | 8-223556 A | 8/1996 |
| JP | 08-336104 A | 12/1996 |
| JP | 09-128408 | 5/1997 |
| JP | 10-136314 | 5/1998 |
| JP | 11-098467 | 4/1999 |
| JP | 11-161663 A | 6/1999 |
| JP | 2000-32429 A | 1/2000 |
| JP | 2000-295578 A | 10/2000 |
| JP | 2001-313930 A | 11/2001 |
| JP | 2002-023719 A | 1/2002 |
| JP | 2005-501363 A | 1/2005 |
| JP | 2005-501364 A | 1/2005 |
| JP | 2005-506785 A | 3/2005 |
| KR | 10-0195106 | 6/1999 |
| KR | 2000-0030073 A | 6/2000 |
| WO | WO-99/59290 | 11/1999 |
| WO | WO-00/63915 A1 | 10/2000 |
| WO | WO-02/21529 A1 | 3/2002 |
| WO | WO-02/50744 A2 | 6/2002 |
| WO | WO-2004/036575 A1 | 4/2004 |
| WO | WO-2004/036576 A1 | 4/2004 |
| WO | WO-2004/051644 A1 | 6/2004 |

* cited by examiner

METHOD AND APPARATUS FOR
REPRODUCING DATA RECORDED ON AN
INTERACTIVE RECORDING MEDIUM IN
CONJUNCTION WITH ASSOCIATED
AUXILIARY DATA RECORDED IN
MULTIPLE LOCATIONS

BACKGROUND OF THE INVENTION

1. Field of the Invention

The present invention relates to a method for reproducing A/V data recorded on an interactive recording medium in conjunction with contents data recorded thereon or contents data provided by a contents providing server connected through the Internet.

2. Description of the Related Art

High-density optical disks capable of recording large amounts of data are being widely used. The Digital Versatile Disc (DVD), which is a recording medium that is capable of recording large amounts of high-quality video data as well as digital audio data, is one example of these high-density optical disks.

The DVD includes a navigation data recording area in which navigation data required for playback control of A/V data is recorded and a data stream recording area in which digital data streams are recorded.

When a DVD is loaded into a DVD reproducing apparatus, the DVD reproducing apparatus first reads the navigation data recorded in the navigation data recording area and stores the navigation data in an internal memory. The DVD reproducing apparatus then begins reproduction of the DVD using the stored navigation data, thereby providing various functions of the DVD to a viewer.

The development of new interactive DVDs is being progressing rapidly. Unlike the DVD, the interactive DVD (I-DVD) contains additional contents data, which is detailed information about A/V data recorded thereon and provides the contents data through a user interface. The contents data may be recorded on the I-DVD as html files.

In addition, a method for obtaining additional contents data from a contents providing server connected through the Internet while reproducing A/V data and contents data recorded on the I-DVD is under discussion. However, a method for effectively managing reproduction of A/V data and contents data responsive to a viewer's request is not yet available.

SUMMARY OF THE INVENTION

It is an object of the present invention to provide a method for reproducing data recorded on an interactive recording medium in conjunction with contents data provided by a contents providing server using navigation information for the contents data also provided by the contents providing server.

The method for reproducing A/V data recorded on an interactive recording medium in accordance with the present invention comprises the steps of (a) receiving playback control information for the A/V data from a contents providing server and storing the received playback control information and (b) presenting the A/V data reproduced from the interactive recording medium in conjunction with additional contents data received from the contents providing server using the stored playback control information.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings.

DETAILED DESCRIPTION OF THE PREFERRED EMBODIMENTS

In order that the invention may be fully understood, preferred embodiments thereof will now be described with reference to the accompanying drawings.

Figure 1:
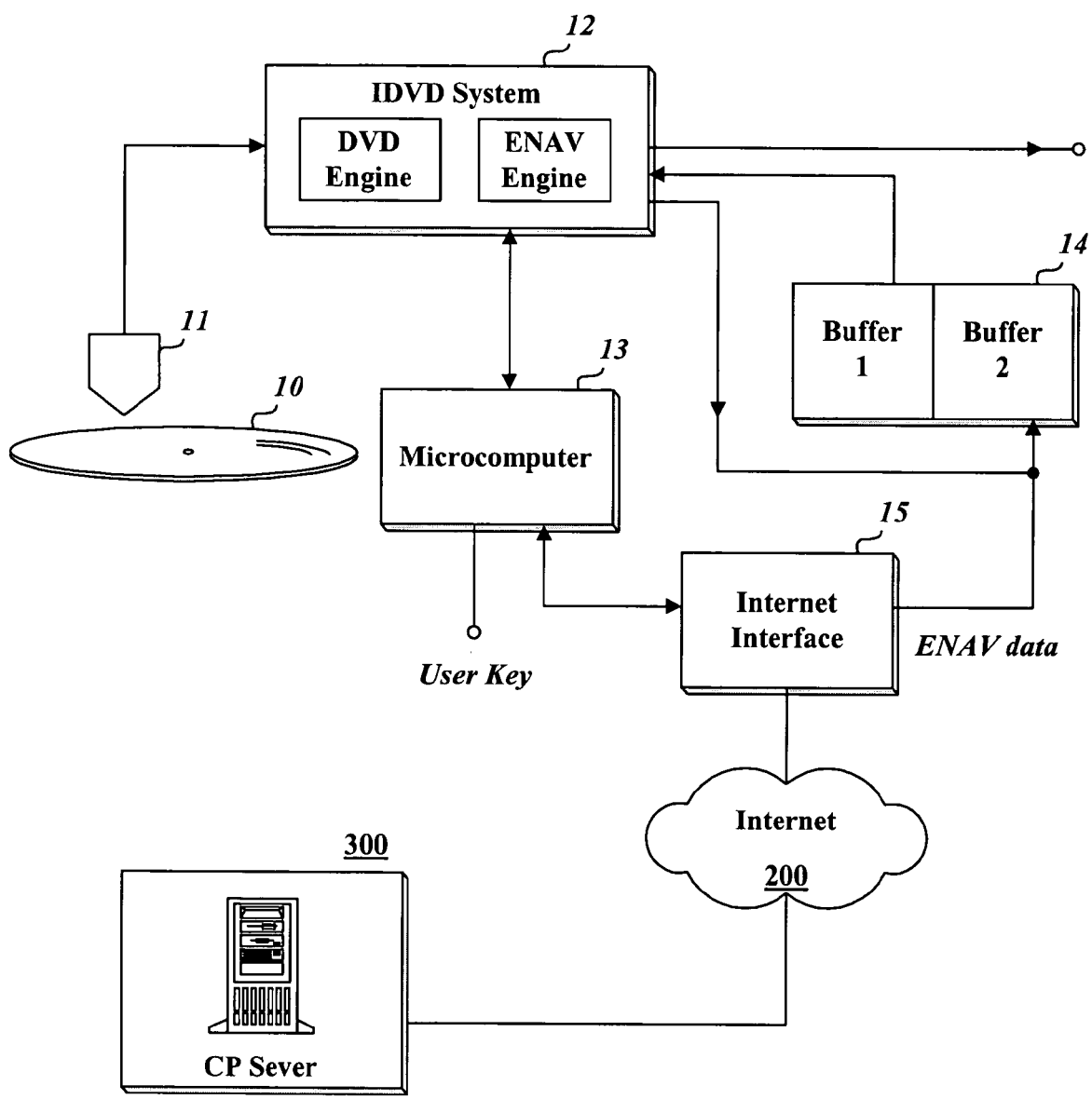
FIG. 1 illustrates an interactive optical disk reproducing apparatus in which the present invention may be advantageously embodied.

FIG. 1 illustrates an interactive optical disk reproducing apparatus in which the present invention may be advantageously embodied. The reproducing apparatus 100 comprises an optical pickup 11, an IDVD system 12, a microcomputer 13, a buffer memory 14, and an Internet interface 15 through which the apparatus 100 is connected to a contents providing server 300.

The IDVD system 12 includes a DVD engine for reproducing A/V data recorded on an I-DVD 10 and an enhanced navigation (ENAV) engine for reproducing contents data provided by the contents providing server 300 or contents data recorded on the I-DVD 10.

The IDVD system 12 outputs the contents data in synchronization with the A/V data from the IDVD 10. As shown in FIG. 1, the reproducing apparatus 100 is connected to the contents providing server 300 through the Internet interface 15 by the mutual operations of the microcomputer 13 and the ENAV engine included in the IDVD system 12.

ENAV contents data, which is additional contents data associated with the A/V data being reproduced from the I-DVD 10, is downloaded from the contents providing server 300 and then temporarily stored in the buffer memory 14. The buffer memory 14 can be logically divided into a first buffer (buffer 1) and a second buffer (buffer 2).

The ENAV engine in the IDVD system 12 outputs the A/V data from the I-DVD 10 in synchronization with the ENAV contents data from the I-DVD 10 or outputs the A/V data from the I-DVD 10 in synchronization with the ENAV contents downloaded from the contents providing server 300.

The contents providing server 300 provides various ENAV contents data associated with the A/V data recorded on the I-DVD 10 as a plurality of data files and provides ENAV navigation information for synchronizing the A/V data with the data files. The navigation information may be provided all at once or may be divided into a plurality of pieces and provided one by one when needed.

Figure 2:
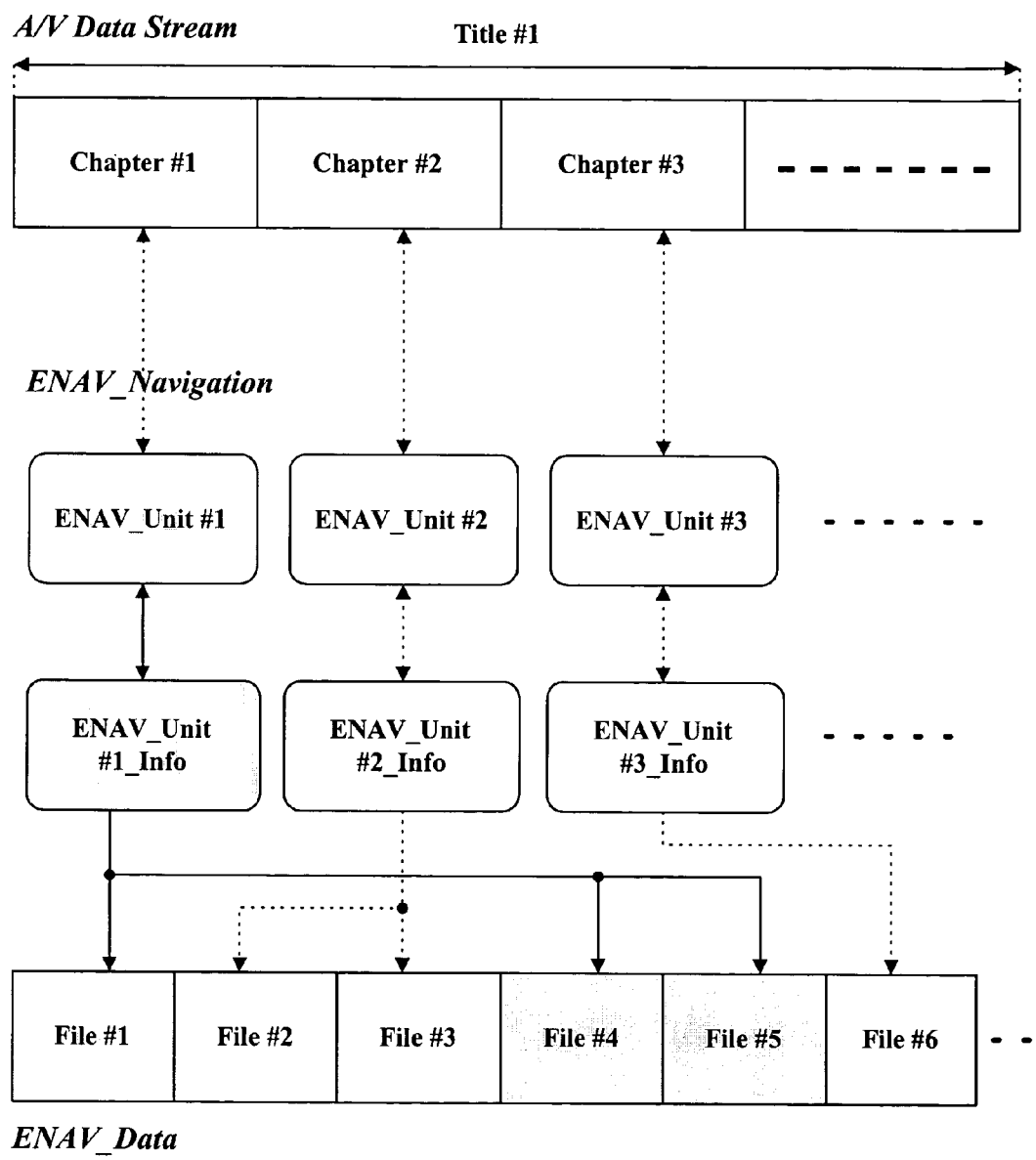
FIG. 2 illustrates the relationship among an A/V data stream, contents navigation information, and contents data files in accordance with the present invention.

As shown in FIG. 2, for example, a title of the I-DVD 10 is organized into individual chapters (Chapter#1, Chapter#2, . . . ) and one or more data files (File#1, File#2, . . . ) corresponding to each of the chapters are organized as an ENAV unit. Navigation information for managing the data files included in the ENAV unit is provided as ENAV unit information (ENAV_Unit_Info).

The multiple pieces of ENAV unit information (ENAV_Unit#1_Info, ENAV_Unit#2_Info, . . . ) are defined as a linked list and transmitted along with the ENAV contents data files or transmitted before the ENAV contents data files are sent.

Figure 3:
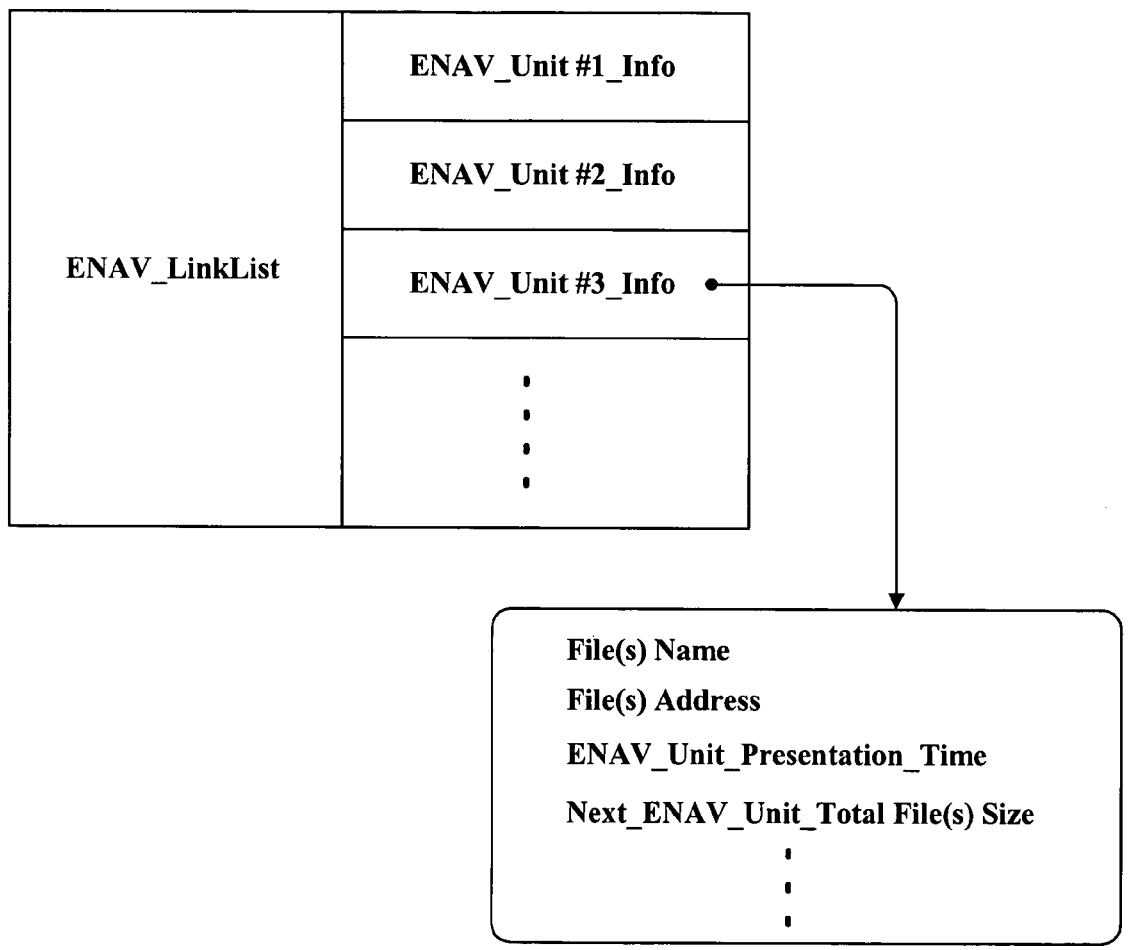
FIG. 3 illustrates an embodiment of contents navigation information in accordance with the present invention.

As shown in FIG. 3, the ENAV unit information includes file names of data files included in the associated ENAV unit (File(s) Name), addresses of the data files in the contents providing server 300 (File(s) Address), the presentation time of the associated ENAV unit (ENAV_Unit_Presentation_ Time), and the total size of data files included in the next ENAV unit (Next_ENAV_Unit_Total File(s) Size).

The microcomputer 13 controls the DVD engine and the ENAV engine included in the IDVD system 12 using the ENAV unit information of the linked list provided by the contents providing server 300.

The microcomputer 13 correlates chapters of the A/V data stream reproduced by the DVD engine with data files reproduced by the ENAV engine using the fields of 'File(s) Name' and 'File(s) Address' included in the ENAV unit information.

In addition, the microcomputer 13 estimates the total presentation time of the ENAV unit being reproduced and determines if the total size of data files of the next ENAV unit exceeds the size of the remaining space of the memory buffer 14 using the fields of 'ENAV_Unit_Presentation_Time' and 'Next_ENAV_Unit_Total File(s) Size' included in the ENAV unit information. If the presentation of the ENAV unit being reproduced requires quite a long time and the memory buffer 14 has no remaining space, the microcomputer 13 sends a command to the contents providing server 300 to delay the transmission of the next ENAV unit data files by the contents providing server 300 for a prescribed time, for example, ½ of the estimated total presentation time of the current ENAV unit.

If the total size of data files of the next ENAV unit exceeds the size of the remaining space of the memory buffer 14, the microcomputer 13 sends a command to the contents providing server 300 for requiring that the contents providing server 300 transmit the data files of the next ENAV unit sequentially by organizing them into several groups or compress the data files before transmission so that the total size of the compressed data files may become less than a prescribed limit.

If the data files are compressed to be transmitted, the microcomputer 13 may present a desired compression rate to the contents providing server 300. For example, if the data files of the next ENAV unit need to be compressed by more than 30% to be stored in the memory buffer 14, the microcomputer 13 sends a desired compression rate of 30% to the contents providing server 300. If the compression rate is achievable, the contents providing sever 300 provides the data files after compression. Otherwise, the contents providing server 300 organizes the data files of the next ENAV unit into several groups and provides the groups sequentially.

By the aforementioned procedure, the interactive optical disk reproducing apparatus 100 can reproduce A/V data from the I-DVD 10 in conjunction with the ENAV contents data provided by the contents providing server 300.

One ENAV unit may correspond to more than one chapter and one chapter may correspond to more than one ENAV unit. The linked list may include other navigation information as well as the ENAV unit information and may be defined as other names such as ENAV playlist.

The method for reproducing data recorded on an interactive recording medium in conjunction with associated auxiliary data in accordance with the present invention allows synchronized reproduction of data from different sources in an interactive optical disk reproducing apparatus.

Figure 4A:
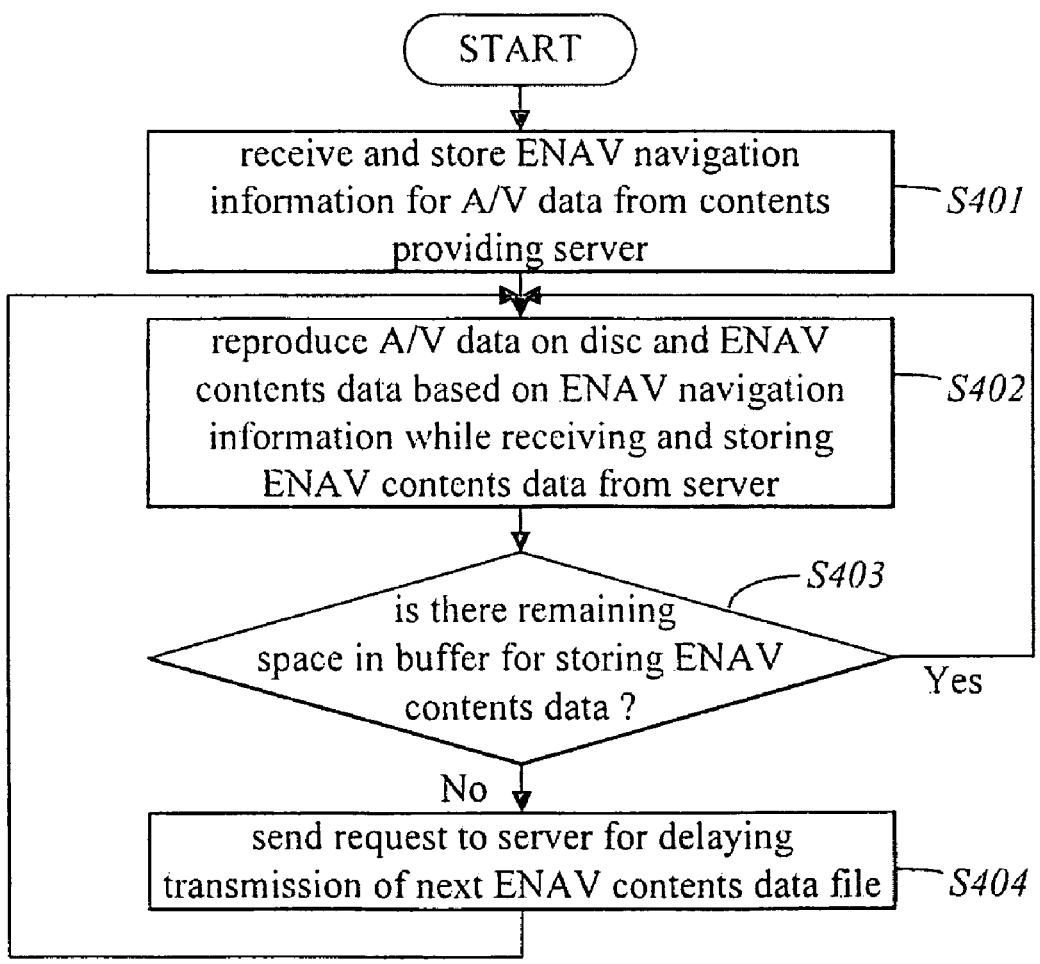
FIGS. 4(a) and 4(b) describe a method according to embodiments of the present invention.

FIG. 4(a) describes a method according an embodiment of the present invention. The process begins with receiving and storing ENAV navigation information for A/V data from a contents providing server (S401). Then, A/V data is reproduced on a disc and ENAV contents data based on ENAV navigation information while receiving and storing ENAV contents data from the server (S402). The method then determines if there is any remaining space in the buffer for storing ENAV contents data (S403). If there is space, the method returns to step S402. If there is no space, the method next sends a request to the server to delay transmitting a next ENAV contents file (S404). The method then returns to step S402.

Figure 4B:
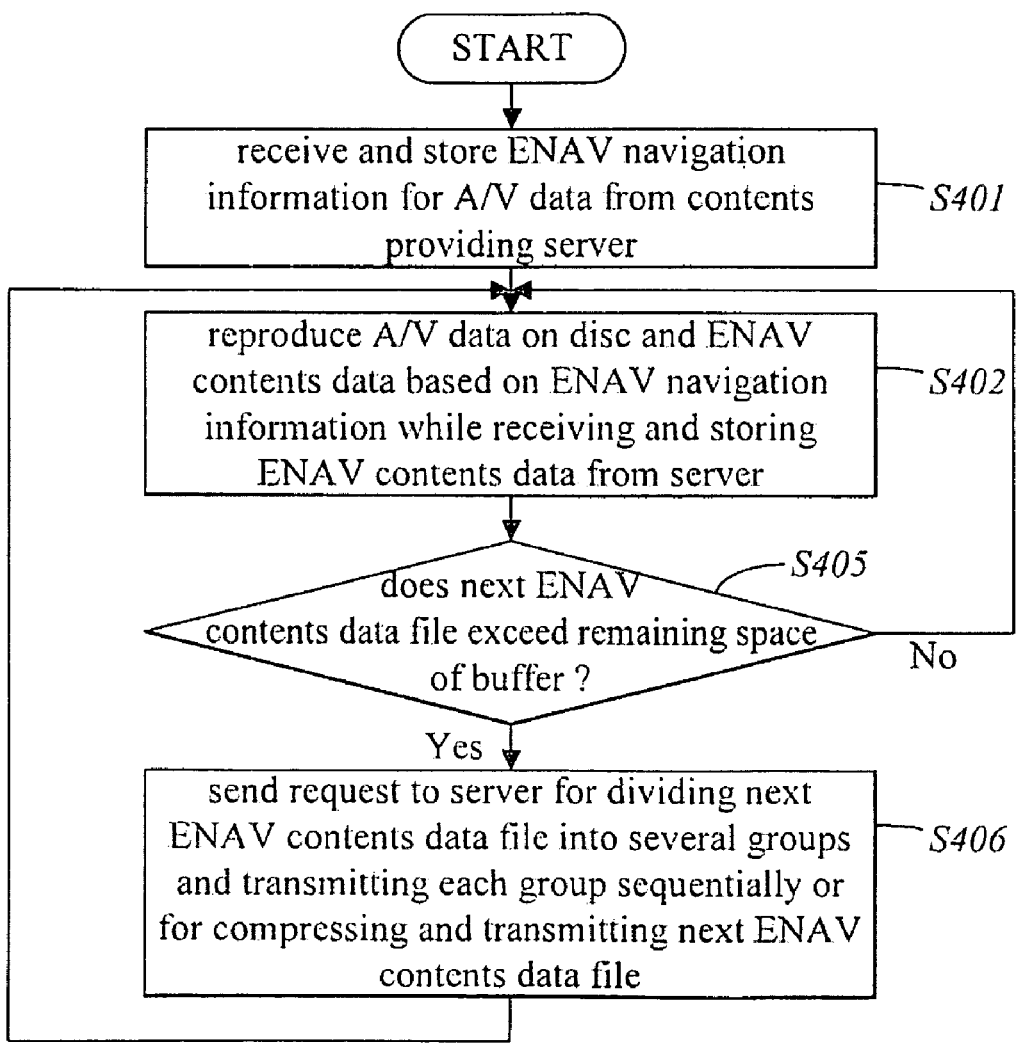

FIG. 4(b) describes a method according an embodiment of the present invention. The process begins with receiving and storing ENAV navigation information for A/V data from a contents providing server (S401). Then, A/V data is reproduced on a disc and ENAV contents data based on ENAV navigation information while receiving and storing ENAV contents data from the server (S402). The method then determines if the next ENAV contents file exceeds the remaining space of the buffer (S405). If not, the method returns to step S402. If yes, the method next sends a request to the server to divide the next ENAV contents data file into two or more groups for separate sequential transmission or for compression as the next ENAV contents file (S406). The method then returns to step S402.

While the invention has been disclosed with respect to a limited number of embodiments, those skilled in the art, having the benefit of this disclosure, will appreciate numerous modifications and variations therefrom. It is intended that all such modifications and variations fall within the spirit and scope of the invention.

What is claimed is:

1. A method for reproducing A/V data recorded on an interactive recording medium, comprising the steps of:
receiving playback control information for the A/V data from a contents providing server and storing the received playback control information in a buffer memory, the playback control information including a presentation time associated with additional contents data, the received playback control information being stored in one area among at least two areas of the buffer memory which is divided into at least two areas logically, wherein the additional contents data is associated with the A/V data and is provided from the contents providing server; and
presenting the A/V data reproduced from the interactive recording medium in conjunction with the additional contents data received from the contents providing server using the stored playback control information.

2. The method set forth in claim 1, wherein the additional contents data is organized into a plurality of data files.

3. The method set forth in claim 1, wherein the playback control information is provided all at once by the contents providing server or is divided into multiple pieces and provided one by one when needed by the contents providing server.

4. The method set forth in claim 1, wherein the playback control information includes access information for data files of the additional contents data to be reproduced in conjunction with some intervals of the A/V data.

5. The method set forth in claim 4, wherein the playback control information further includes information on the size of data files of additional contents data that will be received next.

6. The method set forth in claim 4, wherein the access information for data files of the additional contents data is file names of the data files or addresses of the places in which the data files are stored.

7. The method set forth in claim 4, wherein the presenting step further includes the step of sending a request to the contents providing server for requiring that the contents providing server change the expected transmission time of data files of additional contents data to transmit next with reference to the information on presentation time of each data file included in the playback control information.

8. The method set forth in claim 7, wherein the request is to delay the expected transmission time.

9. The method set forth in claim 8, wherein the request to delay the expected transmission time is made when the additional contents data files cannot be stored in the remaining space of the one area of the buffer memory.

10. The method set forth in claim 5, wherein the presenting step further includes the step of determining a transmission method for additional contents data to be received next by comparing the information on the size of data files of additional contents data that will be received next with the size of the remaining space of the one area of the buffer memory for temporarily storing the additional contents data and sending a transmission request according to the determined method.

11. The method set forth in claim 10, wherein the transmission request is for requiring that the contents providing server divides the data files of the additional contents data that will be received next into several groups and transmit the groups individually.

12. The method set forth in claim 10, wherein the transmission request is for requiring that the contents providing server compresses the data files of the additional contents data that will be received next before transmission.

13. The method set forth in claim 12, wherein information on the lowest allowable compression rate is provided when the request is made.

14. An apparatus for reproducing A/V data recorded on an interactive recording medium, comprising:
- a receiving unit adapted to receive playback control information for the A/V data from a contents providing server, the playback control information including a presentation time associated with additional contents data, wherein the additional contents data is associated with the A/V data and is provided from the contents providing server;
- a buffer memory adapted to store the received playback control information, the buffer memory being divided into at least two areas logically, the received playback control information being stored in one area among two areas;
- a presentation engine adapted to reproduce the A/V data and the additional contents data; and
- a controller adapted to control a presentation of the A/V data reproduced from the interactive recording medium in conjunction with the additional contents data received from the contents providing server using the playback control information.

15. The apparatus set forth in claim 14, wherein the receiving unit is adapted to receive the playback control information all at once by the contents providing server to receive multiple pieces one by one when needed by the contents providing server.

16. The apparatus set forth in claim 14, wherein the playback control information includes access information for data files of the additional contents data to be reproduced in conjunction with some intervals of the A/V data,
  wherein the controller is adapted to control the presentation engine to reproduce the additional data in response to the access information.

17. The apparatus set forth in claim 16, wherein the playback control information further includes information on the size of data files of additional contents data that will be received next,
  wherein the controller is adapted to control the presentation engine to reproduce the additional contents data using information on the size of the data files of additional contents data.

18. The apparatus set forth in claim 16, wherein the access information for data files of the additional contents data is file names of the data files or addresses of the places in which the data files are stored.

19. The apparatus set forth in claim 16, wherein the controller is adapted to transmit a request to the contents providing server for requiring that the contents providing server changes the expected transmission time of data files of additional contents data to transmit next with reference to the information on presentation time of each data file included in the playback control information.

20. The apparatus set forth in claim 19, wherein the request is to delay the expected transmission time.

21. The apparatus set forth in claim 20, wherein the request to delay the expected transmission time is made when the additional contents data files cannot be stored in the remaining space of the area of the buffer memory.

22. The apparatus set forth in claim 17, wherein the controller is adapted to compare the information on the size of data files of next additional contents data with the size of the remaining space of the area of the buffer memory for temporarily storing the additional contents data, determine a receiving method for next additional contents data, and transmit a request according to the determined method to the contents providing server.

23. The apparatus set forth in claim 22, wherein the controller is adapted to request the contents providing server to divide data files of the next additional contents data into several groups and to transmit each group in sequential manner.

24. The apparatus set forth in claim 22, wherein the controller is adapted to request the contents providing server to compress the data files of the next additional contents data before transmission.

* * * * *